United States Patent
Vaquero Avilés-Casco et al.

(10) Patent No.: US 11,200,903 B2
(45) Date of Patent: Dec. 14, 2021

(54) SYSTEMS AND METHODS FOR SPEAKER VERIFICATION USING SUMMARIZED EXTRACTED FEATURES

(71) Applicant: Cirrus Logic International Semiconductor Ltd., Edinburgh (GB)

(72) Inventors: Carlos Vaquero Avilés-Casco, Madrid (ES); Michael Page, Stonehouse (GB)

(73) Assignee: Cirrus Logic, Inc., Austin, TX (US)

( * ) Notice: Subject to any disclaimer, the term of this patent is extended or adjusted under 35 U.S.C. 154(b) by 31 days.

(21) Appl. No.: 16/781,724

(22) Filed: Feb. 4, 2020

(65) Prior Publication Data

US 2020/0279568 A1 Sep. 3, 2020

Related U.S. Application Data

(60) Provisional application No. 62/811,863, filed on Feb. 28, 2019.

(30) Foreign Application Priority Data

May 7, 2019 (GB) ...................................... 1906367

(51) Int. Cl.
| | |
|---|---|
| G10L 17/06 | (2013.01) |
| G10L 17/02 | (2013.01) |
| G10L 17/04 | (2013.01) |
| G10L 21/0272 | (2013.01) |
| G10L 17/00 | (2013.01) |

(52) U.S. Cl.
CPC ............ *G10L 17/06* (2013.01); *G10L 17/00* (2013.01); *G10L 17/02* (2013.01); *G10L 17/04* (2013.01); *G10L 21/0272* (2013.01)

(58) Field of Classification Search
None
See application file for complete search history.

(56) References Cited

U.S. PATENT DOCUMENTS

| | | | | |
|---|---|---|---|---|
| 2014/0142944 | A1* | 5/2014 | Ziv ...................... | G10L 17/02 704/250 |
| 2014/0278435 | A1* | 9/2014 | Ganong, III ............ | G10L 15/22 704/275 |
| 2014/0379332 | A1* | 12/2014 | Rodriguez .............. | G10L 17/12 704/219 |
| 2016/0217793 | A1* | 7/2016 | Gorodetski ............. | G10L 17/04 |

(Continued)

FOREIGN PATENT DOCUMENTS

| | | |
|---|---|---|
| GB | 2563952 A | 1/2019 |
| WO | 2017212235 A1 | 12/2017 |

OTHER PUBLICATIONS

Combined Search and Examination Report under Sections 17 and 18(3), UKIPO, Application No. GB1906367.6, dated Nov. 6, 2019.

*Primary Examiner* — Shaun Roberts
(74) *Attorney, Agent, or Firm* — Jackson Walker L.L.P.

(57) ABSTRACT

A method of speaker verification comprises receiving an audio signal representing speech. While the audio signal is being received, features of the received audio signal are extracted. The extracted features, of at least a part of the received audio signal corresponding to the speech of at least one speaker, are summarised, and the summarised extracted features are stored. In response to a request for a speaker verification process relating to at least one enrolled user, the speaker verification process is performed using the previously summarised features.

19 Claims, 4 Drawing Sheets

(56) References Cited

U.S. PATENT DOCUMENTS

| | | | |
|---|---|---|---|
| 2017/0032784 A1* | 2/2017 | Dadu | G06F 1/3287 |
| 2017/0084295 A1* | 3/2017 | Tsiartas | G10L 17/02 |
| 2017/0110144 A1* | 4/2017 | Sharifi | G06F 21/32 |
| 2017/0351487 A1* | 12/2017 | Aviles-Casco Vaquero | G06F 3/167 |
| 2018/0082689 A1* | 3/2018 | Khoury | H04M 1/271 |
| 2019/0198023 A1* | 6/2019 | Howson | G10L 25/24 |
| 2020/0219517 A1* | 7/2020 | Wang | G10L 15/26 |

* cited by examiner

SYSTEMS AND METHODS FOR SPEAKER VERIFICATION USING SUMMARIZED EXTRACTED FEATURES

The present disclosure claims priority to U.S. Provisional Patent Application Ser. No. 62/811,863, filed Feb. 28, 2019, and United Kingdom Patent Application No. 1906367.6, filed May 7, 2019, each of which is incorporated by reference herein in its entirety.

TECHNICAL FIELD

This disclosure relates to the field of speaker verification, and in particular relates to the storing of summarised extracted features from received audio data, and the use of the stored summarised extracted features in a speaker verification process following a request for the speaker verification process.

BACKGROUND

This disclosure relates to a speaker recognition system. One aim of a speaker recognition system may be to verify that a speaker is who they claim to be, that is to perform speaker verification.

It is desirable to be able to run a speaker recognition system continuously in a device, such that, in response to an input or action from a user of that device that requires authentication of the user, a verification result may be provided by the speaker verification system with low latency. Such a system that operates in this continuous manner may be referred to as an "always-on" system.

However, one drawback to an "always-on" speaker recognition system is that this "always-on" functionality requires both a large amount of memory, to store the data to be processed by the speaker recognition system in the form of an audio or feature buffer, and a large amount of computational power, to continuously process the data in order for the speaker recognition system to be able to provide an output with the low latency.

SUMMARY

According to an aspect of the disclosure, there is provided a method of speaker verification, comprising:
  receiving an audio signal representing speech;
  while the audio signal is being received, extracting features of the received audio signal;
  summarising the extracted features of at least a part of the received audio signal corresponding to the speech of at least one speaker;
  storing the summarised extracted features; and
  in response to a request for a speaker verification process relating to at least one enrolled user, performing said speaker verification process using the previously summarised features.

According to an aspect of the disclosure, there is provided a system for speaker verification, comprising:
  a first module and a second module,
  wherein the first module is configured for:
  receiving an audio signal representing speech;
  while the audio signal is being received, extracting features of the received audio signal;
  summarising the extracted features of at least a part of the received audio signal corresponding to the speech of at least one speaker; and
  causing the summarised extracted features to be stored; and
  wherein, the second module is configured, in response to a request for a speaker verification process relating to at least one enrolled user, for performing said speaker verification process using the previously summarised features.

According to an aspect of the disclosure, there is provided a method of diarisation, comprising:
  receiving an audio signal representing speech;
  while the audio signal is being received, extracting features of the received audio signal;
  based on the extracted features of the received audio signal, performing a provisional separation of the speech represented by the received audio signal into the speech of multiple speakers;
  storing the extracted features; and
  in response to a request for diarisation, performing said diarisation using the stored extracted features.

According to an aspect of the disclosure, there is provided a system for diarisation, comprising:
  a first module and a second module,
  wherein the first module is configured for:
  receiving an audio signal representing speech;
  while the audio signal is being received, extracting features of the received audio signal;
  based on the extracted features of the received audio signal, performing a provisional separation of the speech represented by the received audio signal into the speech of multiple speakers; and
  causing the extracted features to be stored; and
  wherein, the second module is configured, in response to a request for diarisation, for performing said diarisation using the stored extracted features.

According to an aspect of the disclosure, there is provided a method of detecting a spoof attack on a speaker recognition system, the method comprising:
  receiving an audio signal representing speech;
  while the audio signal is being received, extracting features of the received audio signal;
  based on the extracted features of the received audio signal, performing an antispoofing check on the received audio signal;
  storing the extracted features; and
  in response to an authentication request, performing a further antispoofing check using the stored extracted features.

According to an aspect of the disclosure, there is provided a system for detecting a spoof attack, comprising:
  a first module and a second module,
  wherein the first module is configured for:
  receiving an audio signal representing speech;
  while the audio signal is being received, extracting features of the received audio signal;
  based on the extracted features of the received audio signal, performing an antispoofing check on the received audio signal; and
  causing the extracted features to be stored; and
  wherein, the second module is configured, in response to an authentication request, for performing a further antispoofing check using the stored extracted features.

According to an aspect of the disclosure, there is provided a method of detecting a spoof attack on a speaker recognition system, the method comprising:
  receiving an audio signal representing speech;
  while the audio signal is being received, extracting features of the received audio signal;

summarising the extracted features;
storing the summarised extracted features; and
in response to an authentication request, performing a further antispoofing check using the stored summarised extracted features.

According to an aspect of the disclosure, there is provided a system for detecting a spoof attack, comprising:
a first module and a second module,
wherein the first module is configured for:
receiving an audio signal representing speech;
while the audio signal is being received, extracting features of the received audio signal;
summarising the extracted features; and
causing the summarised extracted features to be stored; and
wherein, the second module is configured, in response to an authentication request, for performing a further antispoofing check using the stored summarised extracted features.

BRIEF DESCRIPTION OF DRAWINGS

For a better understanding of the invention, and to show more clearly how it may be carried into effect, reference will now be made, by way of example only, to the accompanying drawings in which.

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

For clarity, it will be noted here that this description refers to speaker recognition and to speech recognition, which are intended to have different meanings. Speaker recognition refers to a technique that provides information about the identity of a person speaking. For example, speaker recognition may determine the identity of a speaker, from amongst a group of previously registered individuals (speaker identification), or may provide information indicating whether a speaker is or is not a particular individual (speaker verification), for example for the purposes of authentication. Speech recognition refers to a technique for determining the content and/or the meaning of what is spoken, rather than recognising the person speaking.

Figure 1:
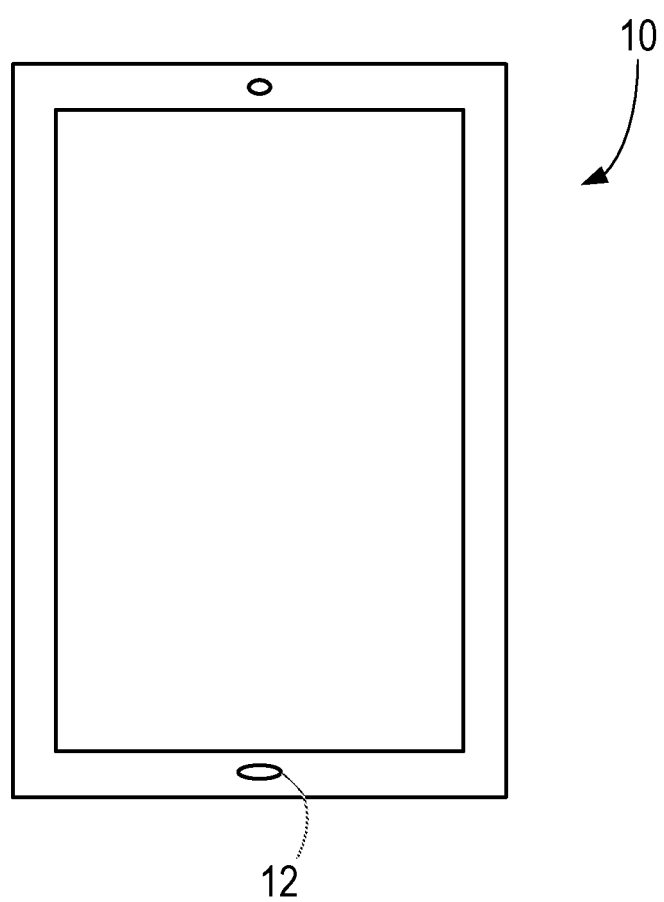
FIG. 1 shows a smartphone.

FIG. 1 illustrates a smartphone 10, having a microphone 12 for detecting ambient sounds. The smartphone 10 is just one example of an electronic device in which the methods described herein can be performed.

Figure 2:
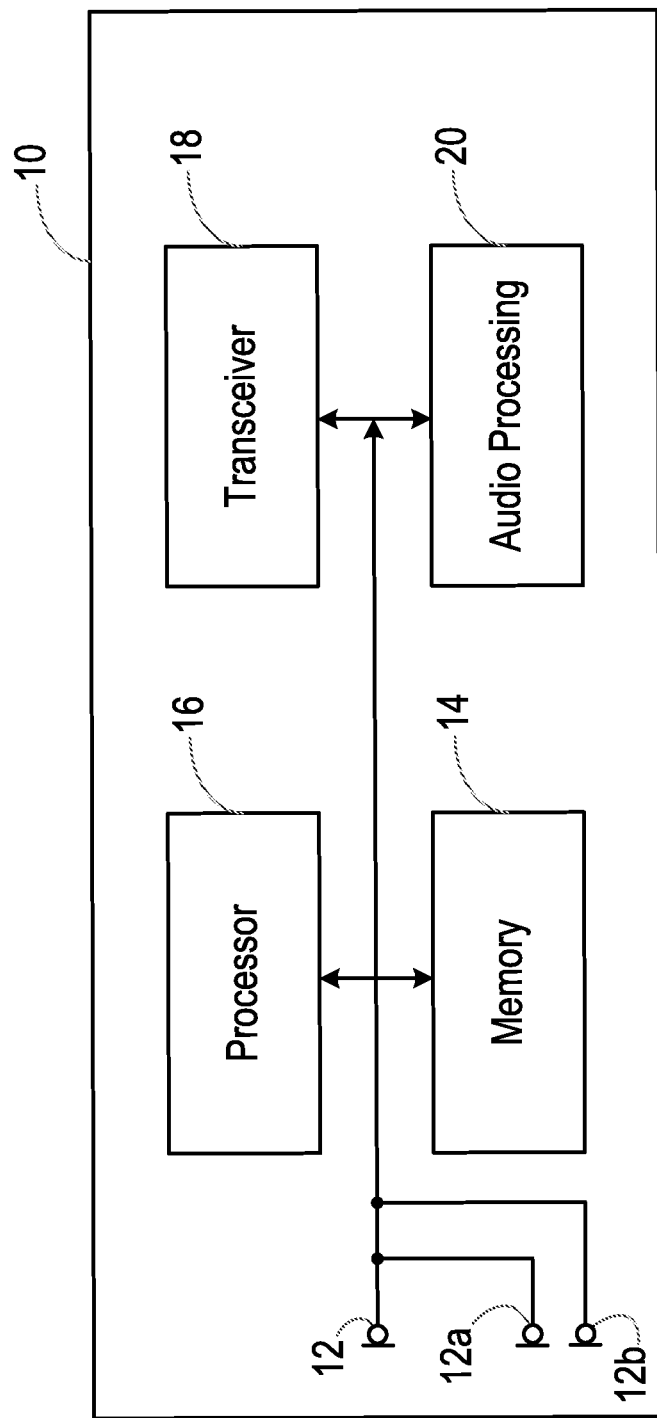
FIG. 2 is a schematic diagram of the smartphone.

FIG. 2 is a schematic diagram, illustrating the form of the smartphone 10.

Specifically, FIG. 2 shows various interconnected components of the smartphone 10. It will be appreciated that the smartphone 10 will in practice contain many other components, but the following description is sufficient for an understanding of the present invention.

Thus, FIG. 2 shows the microphone 12 mentioned above. In certain embodiments, the smartphone 10 is provided with multiple microphones 12, 12a, 12b, etc.

FIG. 2 also shows a memory 14, which may in practice be provided as a single component or as multiple components. The memory 14 is provided for storing data and program instructions.

FIG. 2 also shows a processor 16, which again may in practice be provided as a single component or as multiple components. For example, one component of the processor 16 may be an applications processor of the smartphone 10.

FIG. 2 also shows a transceiver 18, which is provided for allowing the smartphone 10 to communicate with external networks. For example, the transceiver 18 may include circuitry for establishing an internet connection either over a WiFi local area network or over a cellular network.

FIG. 2 also shows audio processing circuitry 20, for performing operations on the audio signals detected by the microphone 12 as required. For example, the audio processing circuitry 20 may filter the audio signals or perform other signal processing operations.

In this embodiment, the smartphone 10 is provided with speaker recognition functionality, and with control functionality. Thus, the smartphone 10 is able to perform various functions in response to spoken commands from an enrolled user. The speaker recognition functionality is able to distinguish between spoken commands from an enrolled user, and the same commands when spoken by a different person. Thus, certain embodiments of the invention relate to operation of a smartphone or another portable electronic device with some sort of voice operability, for example a tablet or laptop computer, a games console, a home control system, a home entertainment system, an in-vehicle entertainment system, a domestic appliance, or the like, in which the speaker recognition functionality is performed in the device that is intended to carry out the spoken command. Certain other embodiments relate to systems in which the speaker recognition functionality is performed on a smartphone or other device, which then transmits the commands to a separate device if the speaker recognition functionality is able to confirm that the speaker was an enrolled user.

In some embodiments, while speaker recognition functionality is performed on the smartphone 10 or other device that is located close to the user, the spoken commands are transmitted using the transceiver 18 to a remote speech recognition system, which determines the meaning of the spoken commands. For example, the speech recognition system may be located on one or more remote server in a cloud computing environment. Signals based on the meaning of the spoken commands are then returned to the smartphone 10 or other local device.

In other embodiments, a first part of the speaker recognition functionality is performed on the smartphone 10 or other device that is located close to the user. Then, as described in more detail below, a signal may be transmitted using the transceiver 18 to a remote system, which performs a second part of the speaker recognition functionality.

Figure 3:
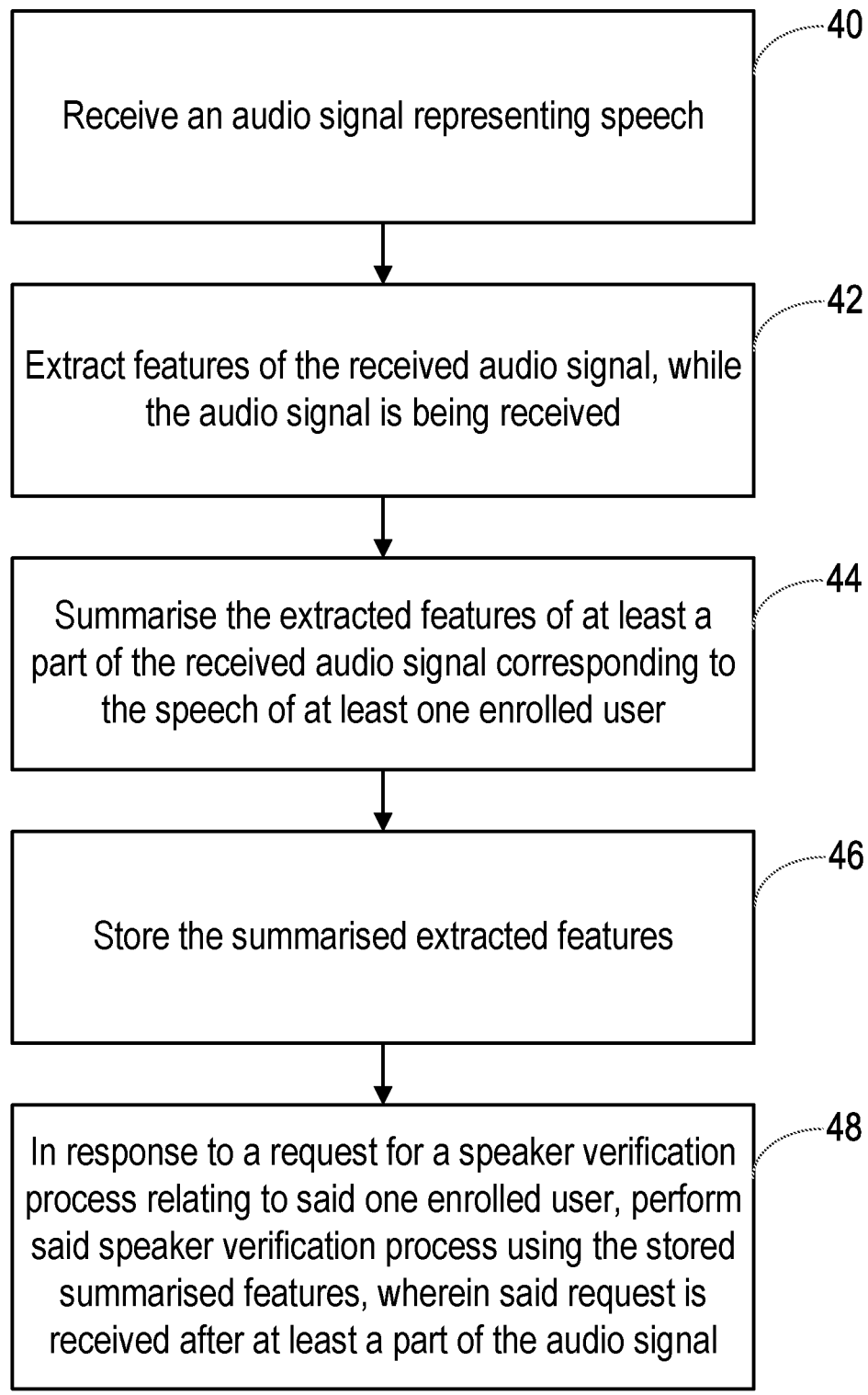
FIG. 3 is a flow chart, illustrating a method.
Figure 4:
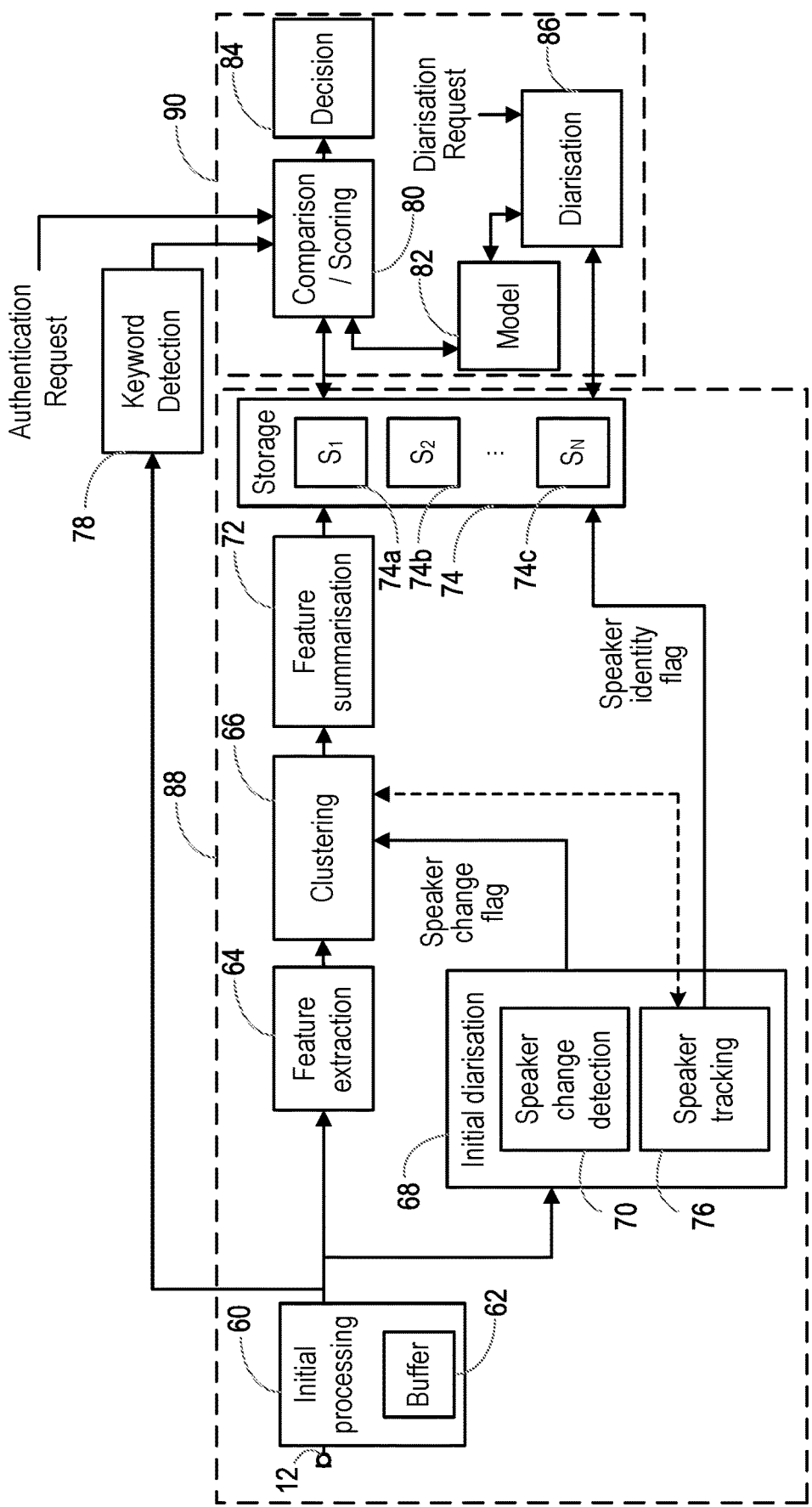
FIG. 4 is a block diagram, illustrating a processing system.

FIG. 3 is a flow chart, illustrating a method of speaker verification, and FIG. 4 is a block diagram illustrating functional blocks in the speaker verification system.

As described in more detail below, the method shown in FIG. 3 is performed after at least one user has registered with the system, for example by providing one or more sets of voice samples that can be used to form one or more models of the user's speech. Typically, the registration or enrolment process requires the user to provide speech inputs, and then uses these speech inputs to form a model of the user's speech, starting from a particular background model defined in a prior development phase. Thus, the background model and the speech inputs are the inputs to the enrolment process that is used to form the model of the user's speech. Subsequently, during speaker recognition, as described in more detail below, further speech inputs are compared with a model of a user's speech, and with a background model, in order to provide an output. For example, in a speaker verification process, an output of this comparison may be a numerical value indicating a likelihood that the speech inputs received during the recognition phase were provided by the same user that provided the speech inputs during enrolment. The numerical value indicative of the likelihood may be for example a log likelihood ratio (LLR) or may be some more indirect indication, for example a metric of distance of extracted features of the speech sample from some one- or multi-dimensional threshold.

As shown in FIG. 4, a microphone 12, for example one of the microphones in the smartphone 10, detects a sound, and this is passed to an initial processing block 60. This initial processing block 60 may for example include an analog-digital converter, for converting signals received from an analog microphone into digital form, and also includes a buffer 62, for storing signals.

As is conventional, this received audio signal is divided into frames, for example of 20 ms duration. It is then determined using a voice activity detection technique whether the received audio signal represents speech. Parts of the received audio signal that represent speech are stored in the buffer 62.

The buffer 62 may, for example, store the parts of the received audio signal representing speech for a fixed time period on a first-in, first-out basis. For example, the buffer 62 may be able to store at least 5 seconds, or at least 10 seconds, of speech.

Thus, in step 40 of the process shown in FIG. 3, the system of FIG. 4 receives the audio signal representing the speech. The received audio signal will depend on the sounds that are detected by the microphone 12, which may include the speech of one or more people, plus associated background sounds.

The received audio signal representing speech is then passed to a feature extraction block 64.

The features that are extracted by the feature extraction block 64 are features representing the input audio that can be used for performing speaker recognition. For example, the features that are extracted could be Mel Frequency Cepstral Coefficients (MFCCs). Other features that can be extracted from the speech signal include Perceptual Linear Prediction (PLP) features, Linear Prediction Coding (LPC) features, and bottleneck features extracted with a deep neural network (DNN). Acoustic features such as MFCCs, PLP features and LPC features can be combined with the DNN-extracted features.

Thus, in the flow chart of FIG. 3, in step 42, features of the received audio signal are extracted while the audio signal is being received.

In some embodiments, the extracted features may be passed to a clustering block 66. The clustering block 66 may attempt to cluster the extracted features received from the feature extraction block 64 into groups, such that all of the extracted features in one group have a high likelihood of being from the same speaker.

In some embodiments, the received audio signal representing speech that is generated by the initial processing block 60 may also be passed to an initial diarisation block 68. The initial diarisation block 68 may perform a tentative, i.e. provisional, diarisation process on the received audio signal. This tentative diarisation process may use speaker change detection, speaker tracking, or any other suitable process. This tentative diarisation process may comprise performing the provisional separation of the speech in real time, without subsequently revising the provisional separation. The output of the provisional diarisation process may be used as part of a speaker verification process or a speaker identification process, as described in more detail below.

The initial diarisation block 68 may include a speaker change detection block 70. The speaker change detection block 70 may then perform a speaker change detection process on the received audio signal. This speaker change detection process may then generate a speaker change flag whenever it is determined that the identity of the person speaking has changed.

For example, in a smartphone 10 that has multiple microphones, the signals generated by the multiple microphones may be analysed. More specifically, the time differences between the arrivals of the sounds at the microphones may be analysed, in order to obtain information about the angle of arrival of the sound that gives rise to the received audio signal representing speech. A change in the identity of the speaker may be inferred in whole or in part based on a change in this angle of arrival.

Alternatively, or additionally, the frequency content of the received audio signal representing speech may be analysed. A change in the identity of the speaker may be inferred in whole or in part based on a detected characteristic frequency of the speech, for example the fundamental frequency F0.

Alternatively, or additionally, features may be extracted from the received audio signal representing speech. Examples of possible features are Mel Frequency Cepstral Coefficients (MFCCs), formants, or bottleneck features extracted with a deep neural network (DNN). A change in the identity of the speaker may be inferred in whole or in part based on a dissimilarity between features of successive time windows. For example, a change in the identity of the speaker may be inferred in whole or in part when a statistical difference between features of successive time windows exceeds a threshold. This method is described in Ajmera et al.; Robust speaker change detection; IEEE Signal Processing Letters; Volume: 11 Issue: 8; 26 Jul. 2004. The speaker change detection block 70 may infer a change in the identity of the speaker in whole or in part based on the same acoustic and/or spectral features as those extracted by the feature extraction block 64, or different acoustic and/or spectral features from those extracted by the feature extraction block 64.

Thus, the speaker change detection block 70 may infer a change in the identity of the speaker in whole or in part based on correlated shifts in the acoustic and/spectral features across multiple domains in order to improve the robustness of the speaker change detection process. The use of multiple feature domains may allow the speaker change detection process to infer a change in speaker in such situations where two speakers sound similar, where two speakers are spatially co-located, and where the speaker change detection process is being performed in a noisy environment.

In some embodiments, the clustering block 66 may receive a speaker change flag generated by a speaker change detection block 70. The clustering block 66 may then use the information in the received series of speaker change flags to cluster the features received from the feature extraction block 64 into groups, such that all of the extracted features in one group have a high likelihood of being from the same speaker. This means that the features relating to one segment of speech are clustered together, where that segment is spoken by a single speaker.

Clustering the extracted features into groups, such that all of the extracted features in one group have a high likelihood of being from the same speaker, prior to passing the extracted features to a speaker verification process or to a speaker identification process (as described in greater detail below), provides the process with more data corresponding to the speaker, and allows a more accurate speaker verification or speaker identification result to be generated by the process.

Thus, the clustering block 66 performs a provisional separation of the speech represented by the received audio signal into the speech of multiple speakers.

The clustering block 66 may then pass the clustered groups of extracted features, where all of the extracted features in one group have a high likelihood of being from the same speaker, to the feature summarisation block 72. The feature summarisation block 72 may then, for each group, summarise the extracted features within that group, such that the summarised extracted features that are output for each group have a high likelihood of corresponding to the same speaker.

In some embodiments, the extracted features as described above may be summarised by computing the sufficient statistics of the extracted features. The extracted features as described above are examples of features that are suitable for use in speaker recognition systems that are based on GMM or HMM. In certain embodiments, the zeroth order sufficient statistics N, the first order sufficient statistics F, and the second order sufficient statistics S of the extracted features may be computed.

In this case, the summarised extracted features can be defined by the triplet, C:

$$C = \{N, F, S\}$$

For a sequence of T features $X = \{x_1, \ldots, x_T\}$, and for example considering a Universal Background Model (UBM) to summarize speaker-independent speech features which is a GMM with G Gaussian components with weight, mean and covariance for the Gaussian component g defined by the triplet $\{w_g, \mu_g, \Sigma_g\}$, the sufficient statistics can be computed as:

$$N_g = \sum_T \gamma_g(x_t)$$

$$F_g = \sum_T \gamma_g(x_t) x_t$$

$$S_g = \sum_T \gamma_g(x_t) x_t x_t^*$$

Where $\gamma_g(x_t)$ is the responsibility of Gaussian g which is defined as the probability that the Gaussian g generated the feature vector $x_t$, defined as:

$$\gamma_g(x_t) = \frac{P(x_t, g)}{\sum_{h=1 \ldots G} P(x_t, h)}$$

$$P(x_t, g) = w_g P\left(x_t \mid \mu_g, \sum_g\right)$$

and $$P(x_t, h) = w_h P\left(x_t \mid \mu_h, \sum_h\right)$$

And $P(x_t | \mu_g, \Sigma_g)$ is the likelihood of $x_t$ for Gaussian model with mean $\mu_g$ and covariance $\Sigma_g$.

The size of the sufficient statistics is fixed, and for a GMM-UBM with G components and feature vectors of dimension D the sizes of the different sufficient statistics are given by:

$$N = \begin{bmatrix} N_1 \\ \vdots \\ N_G \end{bmatrix},$$

which has a size of (G×1)

$$F = \begin{bmatrix} F_1 \\ \vdots \\ F_G \end{bmatrix},$$

which has a size of ((G×D)×1)

$$S = \begin{bmatrix} S_1 & \overline{0} & \overline{0} \\ \overline{0} & \ddots & \overline{0} \\ \overline{0} & \overline{0} & S_G \end{bmatrix},$$

which has a size of (D×G)×(D×G), or (D×D)×G excluding zeroes.

Note that S is a diagonal block matrix, and so there is no need to store the zeros off of the diagonal blocks, only G matrices $S_1, \ldots, S_G$ having dimensions (D×D). Storage can be reduced further taking into account that the matrices $S_g$ are symmetric, and even further if the covariances $\Sigma_g$ are diagonal (so only a column of size ((G×D)×1) is needed for S).

It can therefore be seen that the total size of C={N,F,S} is independent of the length T of the feature sequence X, and so in this way the summarised extracted features for a given segment of speech will have a fixed size.

The same features as described above can be extracted, and the sufficient statistics can again be used to summarise the extracted features, for speaker recognition systems that are based on any Joint Factor Analysis (JFA) technique, or a Tied Mixture of Factor Analyzer (TMFA).

Thus, in some embodiments, the summarised extracted features, derived from the extracted features, comprise the sufficient statistics as described above. In other embodiments, for example when the speaker recognition system described in more detail below uses probabilistic linear discriminant analysis (PLDA), cosine distance scoring, or a support vector machine (SVM) classifier, the summarised extracted features may comprise identity vectors (i-vectors) obtained from the extracted features, or may comprise speaker embeddings obtained from a neural network. These can alternatively be passed to a neural network for determining the verification or identification score used for determining whether the signal is obtained from an enrolled speaker.

Thus, an i-vector can itself be a form of summarised extracted feature. An i-vector is a fixed-length low-dimensional feature vector that represents an utterance or an audio segment. An i-vector extracted from an audio segment under evaluation can be evaluated directly by comparing it with a target i-vector (obtained from the enrolled speaker).

A verification or identification score can then eventually be computed with techniques such as dot scoring or PLDA.

Where the speaker verification or identification is performed using a PLDA speaker recognition method, we may compute the sufficient statistics of the i-vectors. The computed sufficient statistics may be the zeroth order (N) and first order (F), which for i-vectors or speaker embeddings $w_i$ are defined as $$N = \sum_i 1$$

$$F = \sum_i w_i$$

Sufficient statistics may be computed to summarise the extracted features, but this summarisation may take an even more compressed form, referred to as miniStats. MiniStats are a projection of sufficient statistics in subspaces of low dimensionality. The resulting vectors are the sufficient information that are needed to compute verification or identification scores in a speaker recognition process. The advantage of miniStats is that the stored information to compute verification or identification scores in a speaker recognition system is smaller than the original information stored with the sufficient statistics. The necessary condition to be able to summarize stats in miniStats is that the distributive property can be applied on miniStats in the formula to compute the verification or identification score in a speaker recognition process.

In a JFA speaker recognition system, in order to compute a verification or identification score, we need to perform the following calculations involving sufficient statistics:

$$U^*\Sigma^{-1}*F$$

where U is a concatenation of as many matrices as factors we have defined of size R×(C*D), R being the sum of dimensions of all factors, C the number of Gaussians and D the dimensionality of the features, $\Sigma$ is the covariance matrix of size (C*D)×(C*D), including zero blocks as defined above, and F is the supervector of first order sufficient statistics of size (C*D)×1.

Thus, if we store the result of this operation, we will save a vector of size R×1 instead of the sufficient statistics of size (C*D)×1. The distributive operation can be applied in this operation because, if we have $F_1$ being the supervector of sufficient statistics at time 1 and $F_2$ at time 2, we have that $$U^*\Sigma^{-1}*F1 + U^*\Sigma^{-1}*F2 = U^*\Sigma^{-1}*(F_1+F_2),$$

and saving the addition of miniStats gives the same result as the projection of the sum of sufficient statistics.

U is the concatenation of all subspace factor loading matrices that we have and we want to marginalize during the summarisation. Hence, U can be just the channel matrix if we only define a channel factor, or the concatenation of channel and speaker matrix if we define channel and speaker factors.

In short, the miniStats vector of order 1 is $U^*\Sigma^{-1}*F$

Another calculation that we need to perform in a JFA speaker recognition system is $$tr(\Sigma^{-1}*S)$$

where tr is the trace operator and S is the second order sufficient statistics. In this case, if we save the result of this operation we pass from the size of S, which is C*(D×D) to the size of the result of the trace operation, which is 1. And the distributive operation also applies, since $$tr(\Sigma^{-1}*S_1) + tr(\Sigma^{-1}*S_2) = tr(\Sigma^{-1}*(S_1+S_2))$$

In short, the miniStats of order 2 is the scalar $tr(\Sigma^{-1}*S)$.

Suitable forms of miniStats can also be used, when the speaker recognition is based on GMM Maximum a Posteriori (MAP), Joint Factor Analysis (JFA), or three-mode factor analysis (TMFA).

When the speaker recognition is based on probabilistic linear discriminant analysis (PLDA), the summarised extracted features can be based on the PLDA statistics, described for example in EP-2897076A.

Thus, in the flow chart of FIG. 3, in step 44, the extracted features of at least a part of the received audio signal corresponding to the speech of at least one enrolled user, are summarised.

The summarised extracted features that are output by the feature summarisation block 72 are then passed to a storage block 74, where the summarised extracted features are stored in memory. The storage block 74 may comprise storage sub-blocks 74a, 74b, 74c, etc.

A measure of the quality of the received audio signal (for example a signal-to-noise ratio) may also be formed periodically when the signal is received, and this quality measure may be used to determine what relative weight should be given to the features that were extracted from the respective section of the received signal.

Thus, in the flow chart of FIG. 3, in step 46, the summarised extracted features are stored.

The storage block 74 may allocate one storage sub-block for each group of extracted features that have a high likelihood of being from the same speaker. Thus, in response to each determination that the identity of the speaker in the received audio signal representing speech has changed, the summarised extracted features obtained from the latest segment of the received audio signal are passed to a new storage sub-block within the storage block 74.

In some embodiments, the initial diarisation block 68 may alternatively or additionally include a speaker tracking block 76. The speaker tracking block 76 may perform a speaker tracking process on the received audio signal. The speaker tracking block 76 may be configured to receive a speaker change detection flag from the speaker change detection block 70. In response to receiving a speaker change detection flag, indicating that the identity of the person speaking has changed in the received audio signal representing speech, the speaker tracking block 76 may determine some information about the identity of the speaker in a segment of the received audio signal, where the segment is the part of the received audio signal that was received between the most recent speaker change detection flag, and the immediately preceding speaker change detection flag. If the most recent speaker detection flag was the first one, then the segment may be defined to be the part of the received audio signal that was received between the beginning of the received audio signal representing speech and the most recent speaker change detection flag.

The speaker tracking block 76 may then compare the features of the most recent segment of the received audio signal representing speech with the features of models of the enrolled speaker or speakers. The speaker tracking block 76 may compare the same acoustic and/or spectral features as those extracted by the feature extraction block 64, or different acoustic and/or spectral features from those extracted by the feature extraction block 64. The speaker tracking block 76 may compare the same acoustic and/or spectral features as those used by the speaker change detection block 70, or different acoustic and/or spectral features from those used by the speaker change detection block 70.

Based on this information, the speaker tracking block 76 may identify, for each segment of the received audio signal, which if any of the enrolled speakers was speaking. For example, during each segment of speech, the speaker tracking block 76 processes the data to determine whether the speech corresponds to an enrolled speaker. When it receives a speaker change detection flag, indicating the end of a segment, it will label that segment as belonging to one of the enrolled speakers. If it determines that that segment does not belong to one of the enrolled speakers, it may label that segment as "unknown" or as belonging to a new speaker, in effect enrolling that new speaker for future reference. The process is then repeated for the new segment of speech following the speaker change detection flag, and so on.

The speaker tracking block 76 may have access to speaker models relating to the enrolled speakers. In this case, the speaker tracking block 76 effectively performs a speaker recognition process, by comparing the received speech with these models. Preferably, the speaker tracking block 76 acts as a lightweight biometric, that is, it has a low power consumption and uses relatively little processing power, and thus is suitable for "always on" use, in order to provide an initial indication of the speaker, without necessarily being as accurate as would be possible.

Thus, if there are multiple enrolled users, the speaker tracking block 76 can assign each feature of the speech signal to one of the speakers or to none of them.

The speaker tracking block 76 can work on a stand-alone basis, with no input from the speaker change detection block 70 or from the clustering block 66. It would classify each feature or each fixed length segment to belong to one of the enrolled speakers or none of them.

As an alternative, the speaker tracking block 76 can work in combination with speaker change detection as described above, so that it acts on each segment provided by the speaker change detection block 70, instead of working on a feature-by-feature basis or on segments of fixed length (for example every 1 second).

As a further alternative, the speaker tracking block 76 can work in combination with clustering, so that the clustering block 66 agglomerates segments using information provided by the speaker tracking block 76.

As a further alternative, the speaker tracking block 76 can work in combination with the speaker change detection block 70 and the clustering block 66, such that first speaker change detection is performed, then clustering, and then the speaker tracking block 76 is used to assign each group of features to a given speaker.

The speaker tracking block 76 may then use the comparison of the features of the speech with the features of previous segments, and/or with the features of the models of enrolled speakers, to determine whether the most recent segment of the received audio signal representing speech has been spoken by a speaker that has previously spoken.

Additionally, if it is determined by the speaker tracking block 76 that the speaker of the most recent segment of the received audio signal is not a speaker that has previously spoken, the speaker tracking block 76 may be further configured to perform a form of blind enrolment of that speaker in the system. The blind enrolment may involve forming a model of that speaker's speech, using the features extracted for the purposes of the comparison with previous speech segments, though the system does not have any information about the actual identity of the speaker.

Thus, in any of these methods, the speaker tracking block 76 can output provisional information on who spoke when, including enrolled and new speakers. Of course, if the speaker has not previously been enrolled, the speaker tracking block 76 will only be able to identify a new speaker as "New Speaker A" or the like.

The speaker tracking process may generate a speaker identity flag in respect of each identified segment of the speech. The speaker identity flag may indicate that the speaker of the most recent segment of the received audio signal is the same speaker that has spoken in one or more previous segments of the received audio signal. Alternatively, the speaker identity flag may indicate that the speaker of the most recent segment of the received audio signal has not spoken in one or more previous segments of the received audio signal, and thus is a new speaker in the context of this received audio signal. Where the speaker tracking block 76 is provided with speech models of enrolled speakers, the speaker identity flag may indicate a specific one of the enrolled speakers, or may indicate that the speech does not originate from any enrolled speaker. In other examples, the speaker identity flag may simply indicate that a segment of the speech originated from the same speaker as a specific previous segment of the speech.

In some embodiments, the storage block 74 may receive a speaker identity flag generated by the speaker tracking block 76. The storage block 74 may then store the summarised extracted features passed from the feature summarisation block 72 according to the information that is provided by the speaker identity flag. The storage block 74 may allocate storage sub-blocks such that each storage sub-block corresponds to a different speaker in the received audio signal. The storage block 74 may allocate each group of summarised extracted features received from the feature summarisation block 72 to a storage sub-block according to the information received in the speaker identity flag, where each storage sub-block corresponds to one speaker in the received audio signal. Thus, the summarised extracted features that relate to each of the identified speakers in the received audio signal will be respectively passed to the storage sub-block that corresponds to that speaker.

Thus, there is performed a provisional separation of the speech represented by the received audio signal into the speech of multiple speakers. The separation is performed by the clustering block 66, and/or the speaker change detection block 70, and/or the speaker tracking block 76. The extracted features of the respective parts of the received audio signal corresponding to the speech of each of said speakers are summarised. The summarised extracted features are then stored.

Where the speaker identity flag indicates that the speaker of the most recent segment of the received audio signal is the same speaker that has spoken in one or more previous segments of the received audio signal, the summarised extracted features that relate to the most recent segment are stored in the storage sub-block previously allocated to that speaker. The storage block 74 may be further configured to generate a new storage sub-block in response to the speaker identity flag indicating that a new speaker has been identified in the received audio signal, such that the new storage sub-block corresponds to the new speaker. It will be appreciated that storage block 74 may comprise any number of storage sub-blocks.

In some embodiments, the summarised extracted features that relate to the most recent segment of the received audio signal may be stored in the storage sub-block that has previously been allocated to the speaker of said segment. If said storage sub-block already contains summarised extracted features from at least one previous segment of the received audio signal, the summarised extracted features from the most recent segment of the received audio signal, and the summarised extracted features from at least one previous segment of the received audio signal, may be combined.

In some embodiments, the combined summarised extracted features have a fixed size, measured in terms of the number of bits of memory required to hold the information. That is, the summarised extracted features of each segment of the speech signal have a certain size, regardless of the length of the segment of the received audio signal. When the summarised extracted features of a second segment of the received audio signal (where both the first and the second segment have been spoken by the same speaker in the context of the received audio signal) is combined with the previously stored summarised extracted features of a first segment, the combined summarised extracted features have the same size. Similarly, when the summarised extracted features of a third segment of the received audio signal (where the first, second and third segment have been spoken by the same speaker in the context of the received audio signal) is combined with the previously stored combined summarised extracted features of a first and a second segment, the new updated combined summarised extracted features still have the same size, and this continues for as long as speech segments (where the segments have been spoken by the same speaker in the context of the received audio signal) are received by the storage block 74.

This has the advantage that the amount of memory that must be used for storing the summarised extracted features is fixed.

The received audio signal may also be passed to a keyword detection block 78. The keyword detection block 78 determines whether or not a predetermined keyword has been spoken in the received audio signal. In response to determining that a predetermined keyword has been spoken, the keyword detection block 78 may generate a keyword detection flag.

When the predetermined keyword is spoken by a speaker (for example, "Hello phone"), the speaker may be attempting to "wake-up" the system, and thus the system may then expect to receive a command from the speaker. Thus, when it is determined that the predetermined keyword has been spoken, the system may wish to identify the speaker that spoke the predetermined keyword, such that the system is able to authenticate said speaker should they provide a command to the system.

The keyword detection flag may be passed to a comparison/scoring block 80. The comparison/scoring block may interpret the keyword detection flag as an authentication request by the speaker that spoke the keyword.

The comparison/scoring block 80 may additionally or alternatively be configured to receive an authentication request from a separate process or some other action of the user, for example initiated by a touchscreen input or a button press. For example, in system without a voice trigger, the separate process may be a speech recognition process that has recognised a command in the speech of the received audio signal.

In response to receiving an authentication request from a separate process, or receiving a keyword detection flag from the keyword detection block 78, the comparison/scoring block 80 performs a speaker verification or speaker identification process.

The speaker verification or speaker identification process performed by the comparison/scoring block 80 involves a comparison between one or more of the groups of summarised features stored in the storage block 74, with one or more speaker models stored in the model storage block 82.

The authentication request or keyword detection flag received by the comparison/scoring block 80 may indicate which of the stored groups of summarised features should be retrieved from the storage block 74. The data could be sent from the storage block 74 in response to a request sent from the comparison/scoring block 80, or alternatively the data could be constantly updated in a buffer of the storage block 74 that is accessible by the comparison/scoring block 80 whenever it is activated, with no need to send an explicit request.

For example, the authentication request or keyword detection flag may indicate to the comparison/scoring block 80 that it should retrieve the group of summarised extracted features for the last speaker who spoke in the received audio signal. In other embodiments, the authentication request or keyword detection flag may indicate to the comparison/scoring block 80 that it should retrieve the group of summarised extracted features for the speaker who was speaking in the received audio signal at a specified time. This allows the comparison/scoring block 80 to request the appropriate data from the storage block 74.

Specifically, for example, the aim of the keyword detection flag may be to indicate to the comparison/scoring block 80 that it should retrieve the summarised extracted features for the speaker who spoke the predetermined keyword.

In other embodiments, the authentication request or keyword detection flag may indicate to the comparison/scoring block 80 that it should retrieve the summarised extracted features for a plurality of speakers at a plurality of different times in the received audio signal.

The comparison/scoring block 80 may then request the group or groups of summarised extracted features from the storage block 74 that correspond to the relevant speaker or speakers, and the comparison/scoring block 80 may then use the received group or groups of summarised features in a speaker verification or speaker identification process, as described in more detail below.

The comparison/scoring block 80 may also be configured to retrieve one or more models from the model storage block 82. The models stored in the model storage block 82 may represent the speech of the enrolled users of the system, where the speech samples may have been provided to the system in an enrolment phase. The models may comprise summarised extracted features of the speech of the enrolled users of the system, in the same form as the summarised extracted features generated by the feature summarisation block 72, where the speech may have been provided by the users in an enrolment phase. In some embodiments, the model storage block 82 may only contain one model. Such a situation may occur where the system is part of the smartphone 10, where the smartphone 10 will typically only have one enrolled user, for example. In such a situation, the system will be attempting to verify that a speaker who is speaking in the received audio signal is the single enrolled user in the system, as opposed to attempting to identify which speaker is speaking in the received audio signal, out of a plurality of enrolled users in the system.

In a situation where the authentication request is being received from a separate process, an indication of purported identity may also be provided by the user that provided the authentication request. This indication of purported identity may also be provided to the comparison/scoring block 80.

For example, the received audio signal may also undergo a speech recognition process, and an indication of purported identity of the user may be determined from the context of the speech of the received audio signal. In another example, an indication of purported identity of the user may be provided by a touchscreen input or a button press. For example, the indication of purported identity of the user may be provided by a touchscreen input or a button press, where the input is provided at the same time that the predetermined keyword is spoken in the received audio signal.

In some embodiments, each user enrolled in the system may have a different predetermined keyword. In these embodiments, the keyword detection block 78 may be configured to determine which of the predetermined keywords has been spoken in the received audio signal, and may provide an indication of the purported identity of the speaker of said predetermined keyword to the comparison/scoring block 80 within the generated keyword detection flag.

The comparison/scoring block 80 may thus receive an indication of purported identity, and use the information provided by the received indication of purported identity to determine which model of an enrolled user's speech is retrieved from the model storage block 82. In a speaker identification process, there may be no indication of identity provided alongside the authentication request. In this situation, the comparison/scoring block 80 may retrieve all of the models of all the enrolled users' speech stored in the model storage block 82, in order to complete a speaker identification process as described in greater detail below.

Thus, as part of a speaker verification process, the comparison/scoring block 80 may generate at least one verification score based on a comparison of the retrieved group or groups of summarised extracted features with the model or models retrieved from the model storage block 82.

The verification score may therefore indicate a likelihood that a group of segments of the received audio signal (where each of the segments within the group have been provided by the same speaker) were provided by the user that required authentication. The verification score may be for example a log-likelihood ratio (LLR) or may be some more indirect indication, for example a metric of distance of the summarised extracted features of the speech sample from some one- or multi-dimensional threshold or nominal point or volume in a multi-dimensional speech parameter space.

The verification score can be computed from the received group of summarised extracted features using any desired speaker verification technique that is compatible with the summarised extracted features. For example, many well-known voice biometrics techniques, such as techniques on a Gaussian Mixture Model Universal Background Model (GMM-UBM), GMM Maximum a Posteriori (MAP), Joint Factor Analysis (JFA), or i-vectors can be calculated in an exact way from the UBM sufficient statistics described above.

The verification score generated by the comparison/scoring block 80 may then be passed to a decision block 84. The decision block 84 may make a verification decision based on the verification score. The decision block 84 may compare the verification score with a threshold score, to determine whether the similarity is enough to conclude, to a degree of certainty that is appropriate to the required level of security of the system at that time, that the speaker in the received audio signal is the same user that required authentication. The decision block 84 may output a positive or a negative authentication result in response to this comparison. If the speaker has provided a command to the system, that command may only be executed if a positive authentication result for the speaker has been obtained by the speaker verification process.

The threshold value may be fixed, or may depend on some variable criterion.

For example, if the command is a request for information, for example a request for information about flight times between two cities, then a low threshold score may be set, because the consequences of a mistaken decision to accept the speech as being from the user that required authentication are not serious. However, if the command is a request to supply personal information, or a request to authorise a financial transaction, for example, then the consequences of a mistaken decision to accept the speech as being from the user that required authentication are much more serious, and so a high threshold score may be set, so that a positive authentication result is output only if the system has a high degree of certainty that the speech within the received audio signal does represent the speech of the user that required authentication.

An antispoofing method, which attempts to detect attacks such as replayed recordings of an enrolled user or malware attacks, can be included as part of the speaker verification process, in order to provide information on the robustness of the generated speaker verification score. For example, features of the received signal that are useful for the antispoofing method that is in use can be extracted, and summarized per segment or per cluster. The same summarization techniques mentioned above can also be applied to the features used for the antispoofing method. Then, either continuously (in an "always on" fashion) or on demand, the summarized features can be used to detect spoof attacks on each segment or cluster separately. In other embodiments, an initial antispoofing process may be performed, and this may occur continuously while the signal is being received. Then, on demand, a full antispoofing check may be performed. For example, the full antispoofing check may be performed when the speaker verification process is initiated in response to an authentication request as described above.

Thus, in the flow chart of FIG. 3, in step 48, in response to a request for a speaker verification process relating to said one enrolled user, said speaker verification process is performed using the stored summarised features, wherein said request is received after at least a part of the received audio signal.

In some embodiments, the comparison/scoring block 80 may be configured to perform a speaker identification process. The speaker identification process may attempt to identify if at least one speaker in the received audio signal representing speech is a user enrolled in the system. The speaker identification process may be initiated in response to receiving an authentication request from the keyword detection block 78, or from the separate process or some other action of the user, where no indication of the identity of the speaker is provided alongside the authentication request.

Thus, as part of a speaker identification process, the comparison/scoring block 80 may generate at least one identification score based on a comparison of the retrieved group or groups of summarised extracted features with the model or models retrieved from the model storage block 82.

The identification score may therefore indicate a likelihood that a group of segments of the received audio signal (where each of the segments within the group have been provided by the same speaker) were provided by a user that has previously enrolled in the system. The identification score maybe for example a log-likelihood ratio (LLR) or may be some more indirect indication, for example a metric of distance of the summarised extracted features of the speech sample from some one- or multi-dimensional threshold or nominal point or volume in a multi-dimensional speech parameter space.

The identification score can be computed from the summarised extracted features using any desired speaker identification technique that is compatible with the summarised extracted features. For example, many well-known voice biometrics techniques, such as techniques on a Gaussian Mixture Model Universal Background Model (GMM-UBM), GMM Maximum a Posteriori (MAP), Joint Factor Analysis (JFA), or i-vectors can be calculated in an exact way from the UBM sufficient statistics described above.

The identification scores generated by the comparison/scoring block 80 may then be passed to a decision block 84. The decision block 84 may make an identification decision based on the identification score. The decision block 84 may compare the identification scores (where each identification score corresponds to a comparison of each group of the summarised extracted features with each of the models respectively) with one another, and select the highest identification score. The decision block 84 may compare this selected identification score with a threshold score, to determine whether the similarity is enough to conclude, to a degree of certainty that is appropriate to the required level of security of the system, that the speaker in the received audio signal is a user that has enrolled in the system. The decision block may output a positive or a negative authentication result in response to this comparison. If the speaker has provided a command to the system, that command may only be executed if a positive authentication result for the speaker has been obtained by the speaker identification process.

The threshold value may be fixed, or may depend on some variable criterion.

For example, as discussed above with reference to the verification process, if the command is a request for information, for example a request for information about flight times between two cities, then a low threshold score may be set, because the consequences of a mistaken decision to accept the speech as being from an enrolled user are not serious. However, if the command is a request to supply personal information, or a request to authorise a financial transaction, for example, then the consequences of a mistaken decision to accept the speech as being from an enrolled user are much more serious, and so a high threshold score may be set, so that a positive authentication result is output only if the system has a high degree of certainty that the speech within the received audio signal does represent the speech of an enrolled user of the system.

Again, an antispoofing method, which attempts to detect attacks such as replayed recordings of an enrolled user or malware attacks, can be included as part of the speaker identification process, in order to provide information on the robustness of the generated speaker identification score.

The system of FIG. 4 shows that the initial processing of the received audio signal (up to the storage of the summarised extracted features in storage block 74) may be executed in a first module 88 that may be "always on". The speaker verification and identification processes (executed by the comparison/scoring block 80 and the decision block 84) may be performed in a second module 90 that may be woken only when an authentication request is received by the comparison/scoring block 80. The first module 88 and the second module 90 may be spatially co-located or in separate integrated circuits, or may even be in separate devices. In some embodiments, the storage function (executed by the storage block 74) may be in the second module.

For example, the first module 88 may be comprised within the smartphone 10, and the second module 90 may be comprised within a separate device. A signal may be transmitted using the transceiver 18 of smartphone 10 to the separate device, to indicate that processing should begin in the second module 90. In another example, the first module 88 may be comprised within a first integrated circuit in the smartphone 10, and the second module 90 may be comprised within a second integrated circuit in the smartphone 10.

It will be appreciated that the first module 88 and the second module 90 may be configured such that any first set of the steps of the method of FIG. 3 may be performed by the first module 88, and the remaining steps of the method of FIG. 3 may be performed by the second module 90. For example, the first module 88 may be configured to perform steps 40, 42, 44, and 46 of the method of FIG. 3, and the second module 90 may be configured to perform step 48 of the method of FIG. 3. In another embodiment, the first module 88 may be configured to perform steps 40 and 42 of the method of FIG. 3, and the second module 90 may be configured to perform steps 44, 46 and 48 of the method of FIG. 3.

The first module 88 and the second module 90 may be configurable such that the sets of steps of the method of FIG. 3 performed by the first module 88 and the second module 90 may be variable. By configuring the "always-on" first module 88 to perform a larger set of the steps of the method of FIG. 3, the latency of the system will be reduced, while the power consumption of the system will be increased. Alternatively, by configuring the second module 90 to perform a larger set of the steps of the method of FIG. 3, the latency of the system will be increased, while the power consumption of the system will be reduced. Thus, the steps of the method of FIG. 3 performed by the first module 88 and the second module 90 may be varied in order to change the latency or the power consumption of the system.

In some embodiments, the system may comprise a diarisation block 86. The diarisation block may be configured to receive a diarisation request from a separate process. The diarisation request may indicate to the diarisation block that it should retrieve the groups of summarised extracted features from the storage block 74, where each group of summarised extracted features corresponds to a different speaker in the received audio signal. The diarisation request may also indicate to the diarisation block that it should retrieve the models that represent the speech of the users enrolled in the system from the model storage block 82.

The processes of clustering and speaker tracking, described above, amount to a preliminary form of diarisation, i.e. partitioning the speech into segments, where each segment represents the speech of just one speaker. Thus, as described above, features that are useful for the purposes of diarisation are extracted, and can be used for speaker change detection by the speaker change detection block 70, for clustering by the clustering block 66, and for speaker tracking by the speaker tracking block 76, on a continuous or "always on" basis, and the features can also be summarised by the feature summarisation block 72.

Then, a process performed "on demand" by the diarisation block 86, for example in response to a specific request, can refine the preliminary diarisation process. For example, the diarisation block 86 could perform a more accurate clustering to correct decisions of the "always on" preliminary diarisation process. As an alternative, the preliminary diarisation process may not output any hard decisions, but may instead store information relating to two or more hypotheses for possible clusterings. For example, if the clustering process suggests that two separate segments identified by the speaker change detection process in fact belong to the same speaker rather than to different speakers, the process of feature summarisation can be performed independently for each segment, and information relating to both hypotheses (i.e. that the two segments relate to the speech of a single speaker, and that the two segments relate to the speech of different speakers) can be delivered to the block that performs diarisation on demand. Then, the diarisation block 86 may perform a more refined diarisation process, in order to decide which of the two or more hypotheses is the most likely. Based on the result of the diarisation process, speaker verification may be performed on each segment separately, or on both together.

Whereas the "always on" preliminary form of diarisation may comprise performing a provisional separation of the signal into segments in real time, without subsequently revising the provisional separation, the diarisation process performed by the diarisation block 86 may include steps of performing an initial diarisation in real time, and subsequently revising the initial diarisation taking account of later features.

In some embodiments, the diarisation block 86 can perform a more refined speaker change detection or speaker tracking process, in order to refine the decisions on speaker boundaries taken by the speaker change detection block 70 or the speaker tracking block 76, but that may require all of the features extracted by the feature extraction block 64 to be passed to the diarisation block 86 from the always on module.

Thus, the diarisation block 86 may then perform a comparison between each of the retrieved groups of summarised extracted features, and each of the retrieved models that represent the speech of the users enrolled in the system. The diarisation block 86 may then determine from this comparison, whether any of the speakers in the received audio signal are likely to be one of the users who has previously enrolled in the system. The diarisation block 86 may also determine that one or more speakers in the received audio signal are not users that have previously enrolled in the system.

For example, the diarisation block 86 may determine that the summarised extracted features stored in the storage sub-block 74a correspond to the model of the speech of the second user enrolled in the system. The diarisation block 86 may then determine that the summarised extracted features stored in the storage sub-block 74b do not correspond to any of the models of the speech for any of the users enrolled in the system. The diarisation block 86 may then determine that the summarised extracted features stored in the storage sub-block 74c correspond to the model of the speech of the first user enrolled in the system. The diarisation block 86 may further be configured to passively enroll the speakers in the received audio signal whose summarised extracted features do not correspond to any of the models of speech of any of the user enrolled in the system.

There are therefore disclosed methods and systems that can be used for speaker verification and for diarisation of speech.

The skilled person will recognise that some aspects of the above-described apparatus and methods may be embodied as processor control code, for example on a non-volatile carrier medium such as a disk, CD- or DVD-ROM, programmed memory such as read-only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of speaker verification, comprising:
in a first module:
   receiving an audio signal representing speech;
   while the audio signal is being received, extracting features of the received audio signal;
   performing a provisional separation of the speech represented by the received audio signal into the speech of multiple speakers;
   summarising the extracted features of at least a part of the received audio signal corresponding to the speech of each of said speakers; and
   storing the summarised extracted features; and
in a second module:
   in response to a request for a speaker verification process relating to at least one enrolled user, performing said speaker verification process using the previously summarised extracted features, wherein the first module has a lower power consumption than the second module.

2. The method according to claim 1, comprising:
performing the provisional separation of the speech represented by the received audio signal into the speech of multiple speakers using speaker tracking.

3. The method according to claim 1, comprising:
performing the provisional separation of the speech represented by the received audio signal into the speech of multiple speakers by performing a speaker change detection process.

4. The method according to claim 1, comprising:
performing the provisional separation of the speech represented by the received audio signal into the speech of multiple speakers by clustering audio segments that have a high likelihood of being from the same speaker.

5. The method according to claim 4 comprising:
dividing the received audio signal into segments of fixed length; and
determining whether a segment represents the speech of the same speaker as a preceding segment.

6. The method according to claim 1, comprising, in response to a request for diarisation, performing said diarisation using the previously summarised features.

7. The method according to claim 1, comprising:
identifying a keyword in the speech represented by the received audio signal; and
interpreting the keyword as a request for a speaker verification process relating to a user speaking when the keyword was identified.

8. The method according to claim 1, wherein extracting features of the received audio signal comprises extracting biometrics features from the received audio signal, and
wherein the step of performing said speaker verification process using the previously summarised features comprises performing a biometrics scoring of the extracted features.

9. The method according to claim 8, wherein performing said speaker verification process comprises comparing the previously summarised features with a model of the speech of at least one enrolled user to obtain a biometric score.

10. The method according to claim 1, further comprising performing an antispoofing check using the previously summarised features, in response to the request for the speaker verification process.

11. The method according to claim 1, further comprising performing an antispoofing check on the received audio signal, before storing the previously summarised features.

12. A system for speaker verification, comprising:
a first module and a second module,
wherein the first module is configured for:
receiving an audio signal representing speech;
while the audio signal is being received, extracting features of the received audio signal;
performing a provisional separation of the speech represented by the received audio signal into the speech of multiple speakers;
summarising the extracted features of at least a part of the received audio signal corresponding to the speech of each of said speakers; and
causing the summarised extracted features to be stored; and
wherein, the second module is configured, in response to a request for a speaker verification process relating to at least one enrolled user, for performing said speaker verification process using the previously extracted summarised features, wherein the first module has lower power consumption while operating than the second module.

13. The system as claimed in claim 12, wherein the first module is configured for always-on operation; and wherein the second module is maintained in low-power or inactive state until receiving the request for the speaker verification process.

14. The system as claimed in claim 12, wherein the first module and the second module are provided in separate integrated circuits.

15. The system as claimed in claim 14, wherein the first module and the second module are provided in separate integrated circuits within a device.

16. The system as claimed in claim 15, wherein the first module and the second module are provided in separate integrated circuits within a smartphone device.

17. The system as claimed in claim 14, wherein the first module and the second module are provided in separate devices.

18. The system as claimed in claim 12, wherein the first module is configured for causing the summarised extracted features to be stored in the first module.

19. The system as claimed in claim 12, wherein the first module is configured for causing the summarised extracted features to be stored in the second module.

* * * * *